United States Patent [19]
Gregg, III et al.

[11] Patent Number: 5,510,793
[45] Date of Patent: Apr. 23, 1996

[54] COMBINED RADAR DETECTOR, SPEED MEASURING DEVICE AND PRINTER FOR VERIFYING VEHICLE SPEED

[76] Inventors: Eugene S. Gregg, III, 20 Sally Port Rd., Hilton Head Island, S.C. 29928; James A. Mittler, P.O. Box 132, Bluffton, S.C. 29910

[21] Appl. No.: 413,834

[22] Filed: Mar. 30, 1995

[51] Int. Cl.⁶ ............................ G01S 7/40; G01S 13/87; G01S 13/92
[52] U.S. Cl. ............................................. 342/20; 342/104
[58] Field of Search ........................ 342/20, 190, 104, 342/173, 70; 455/226.4, 227, 228

[56] References Cited

U.S. PATENT DOCUMENTS

D. 355,616   2/1995   Gregg, III et al. ................. D10/46
5,049,885   9/1991   Orr ........................................ 342/20
5,083,129   1/1992   Valentine et al. ..................... 342/20
5,164,729   11/1992  Decker et al. ........................ 342/20
5,381,155   1/1995   Gerber ................................ 342/104

FOREIGN PATENT DOCUMENTS 54-007980   1/1979   Japan .................................. 342/190

*Primary Examiner*—Daniel T. Pihulic
*Attorney, Agent, or Firm*—H. Jay Spiegel

[57] ABSTRACT

The disclosed device enables the user to verify the speed of their vehicle responsive to sensing that a radar device has been used to measure their speed. The device includes a radar detector designed to sense a radar beam. When the detector senses the beam, it activates a speed measuring device mounted on the vehicle which instantaneously measures the vehicle speed and then stores the measured speed for later display and for printing a permanent record, if desired.

7 Claims, 2 Drawing Sheets

COMBINED RADAR DETECTOR, SPEED MEASURING DEVICE AND PRINTER FOR VERIFYING VEHICLE SPEED

BACKGROUND OF THE INVENTION

The present invention relates to a combined radar detector, speed measuring device and printer for verifying vehicle speed. In the prior art, radar detectors and speed measuring devices are known. However, Applicants are unaware of any single device which combines all of the elements of the present invention into a single workable design.

The following prior art is known to Applicants:

U.S. Pat. No. 5,049,885 to Orr

U.S. Pat. No. 5,083,129 to Valentine et al.

U.S. Pat. No. 5,164,729 to Decker et al.

Each of these references teaches a radar detecting device. To Applicants' knowledge, none of these references teaches the combination of elements described in this patent application.

The present invention was developed, mainly because, often, motorists receive speeding tickets which are not deserved. Three main reasons why speeding tickets are not deserved include (1) improper calibration of police radar equipment, (2) operation of police radar equipment by inexperienced police personnel, and (3) improper target identification. In this latter category, it is well known that the strength of a signal being employed by police personnel to measure vehicle speed, when that signal is sensed at the police vehicle, is inversely proportional to the fourth power of the distance ($D^4$) between the police vehicle and the intended target. This is because the strength of the signal decreases proportional to $D^2$ from the police vehicle to the target and again proportional to $D^2$ from the target back to the vehicle. Furthermore, as is also known, the strength of the reflected signal is proportional to the surface area of the target. Thus, for example, the surface area of the front of the cab of an 18 wheel truck may be five times as large as the surface area of the front of an ordinary car. Thus, if such a car and truck are traveling side-by-side, the reflected signal from the truck will be five times as strong as that of the car. Thus, it should be understandable that when such a truck is following a car, it is quite possible that a speed measuring device will measure the speed of the truck even though the car is closer to the police vehicle. Thus, it often occurs that police radar measures a larger vehicle further away from the police radar than the smaller vehicle which is eventually stopped and whose owner is subsequently charged with a speeding offense. It is with these aspects in mind that the present invention was developed.

SUMMARY OF THE INVENTION

The present invention relates to a combined radar detector, speed measuring device and printer for verifying vehicle speed. The present invention includes the following interrelated objects, aspects and features:

(A) In a first aspect, the present invention includes detector means designed to detect use of speed measuring device which is being employed by law enforcement personnel to measure the speed of the user's vehicle. Customarily, the detector will comprise a radar (microwave) detector. However, of course, since other types of speed measuring devices are used by law enforcement officials besides microwave-based devices, the detector which is incorporated into the teachings of the present invention may be of a type which detects microwaves, sound waves, light or other electromagnetic waves, etc.

(B) When the detector detects that a speed measuring device is being employed to measure the speed of the user's vehicle, the detector activates alarm means which may include audio and/or visual aspects so that the user is made aware that a speed measuring device is being employed. Simultaneously, the detector sends out a signal which activates transmitter means mounted on the user's vehicle, which transmitter means transmits a signal which bounces off surrounding stationary surfaces. A beam reflected from the surrounding stationary surfaces comprising a reflected signal is received by receiver means which transmits signals indicative of the reflected signal to a computer with memory. The transmitter means may transmit optical, ultrasonic, microwave or other electromagnetic signals and the receiver means is designed accordingly.

(C) The computer with memory receives the signals from the receiver means, calculates the speed of the user's vehicle in a manner well known to those skilled in the art, and maintains the calculated speed within an internal memory.

(D) The display means may continuously display the measured speed of the user's vehicle or may be activated upon request. Additionally, the computer with memory is connected to printer means which may be activated when desired to print a permanent record of the measured speed for use either in convincing an officer that the user was not speeding or for verification of that fact in Court.

Accordingly, it is a first object of the present invention to provide a combined radar detector, speed measuring device and printer for verifying vehicle speed.

It is a further object of the present invention to provide such a device wherein the radar detector thereof may be replaced with any device which senses the existence, in close proximity, of police operated speed measuring devices of various types.

It is a still further object of the present invention to provide such a device which may measure the speed of the user's vehicle and provide an evidentiary document which may be used in Court.

It is a still further object of the present invention to provide such a device which may include a display for displaying the actual speed of the user's vehicle at the time the speed of the user's vehicle was being measured by police personnel.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
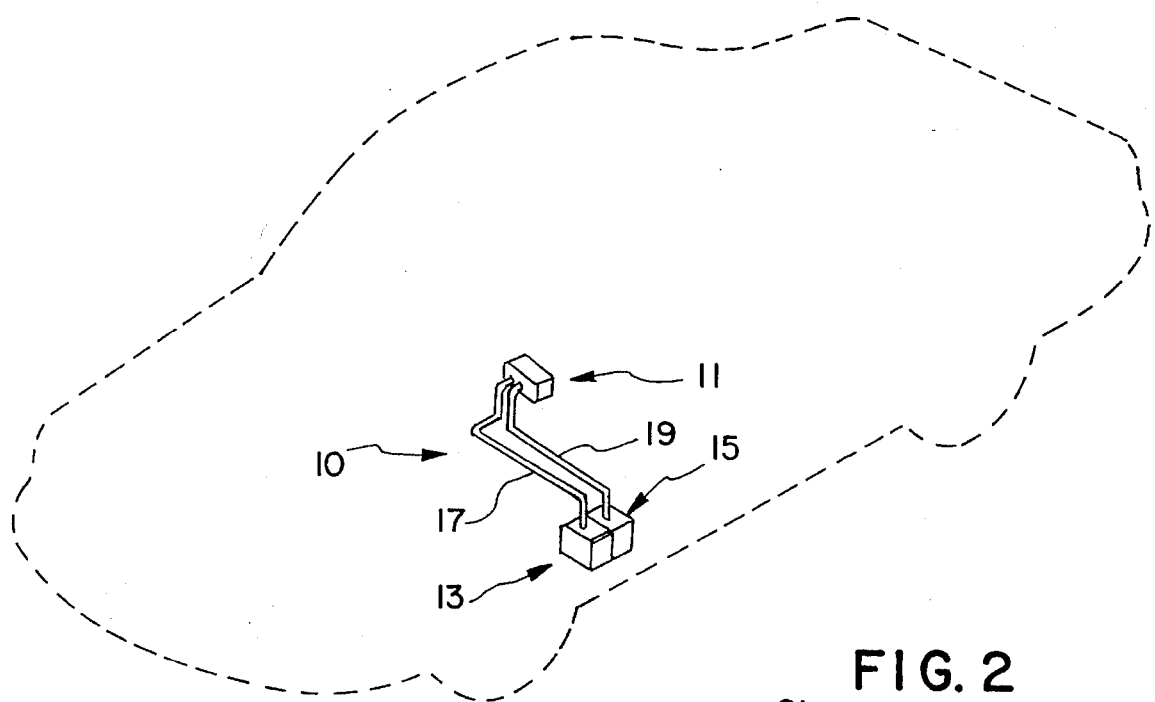
FIG. 1 shows a schematic representation of the combination of elements comprising the present invention with the environment of contemplated use being shown in phantom.

With reference to FIG. 1, a vehicle is designated by the reference numeral 1 and is shown in phantom merely to provide an example of the environment of intended use of the present invention. As shown in FIG. 1, the inventive device is generally designated by the reference numeral 10 and is seen to include a detector 11, a speed measuring device transmitter 13, and a speed measuring device receiver 15. Interconnecting bundles of electrical conductors are schematically represented in FIG. 1 by the reference numerals 17 and 19.

Figure 2:
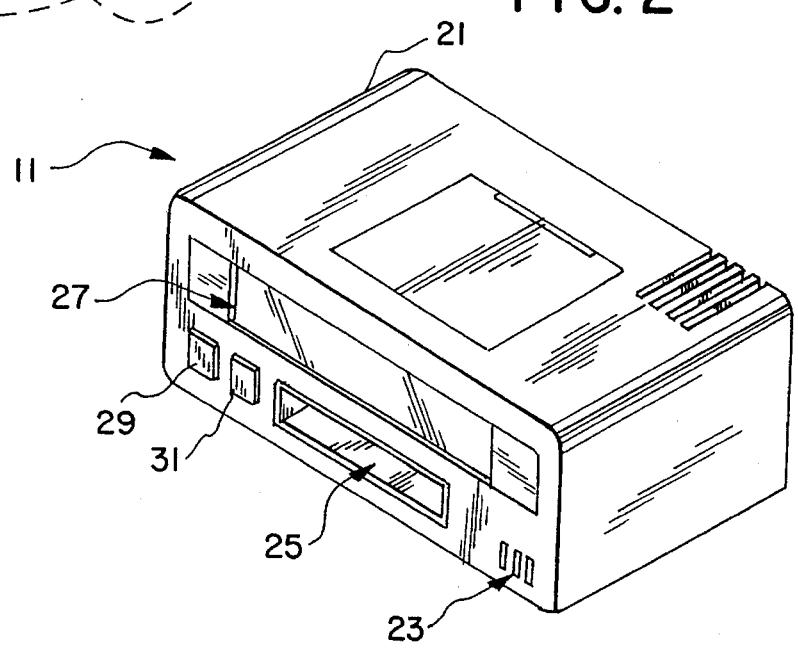
FIG. 2 shows a perspective view of a detector which is intended to be used in the present invention.

With reference, now, to FIG. 2, the detector 11 is seen to include a housing 21 having openings 23 which allow sounds from an audible speaker (not shown) to be heard, a slot 25 allowing access to an internal printer (not shown), a display screen 27 for a purpose to be described in greater detail hereinafter, a recall button 29 and a re-arm button 31.

In the preferred embodiment of the present invention, the detector 11 is in the nature of a radar detector. This is because most speed measuring devices employed by police personnel are, in fact, radar-based devices which rely upon transmission of microwaves and receipt of signals reflected off moving vehicles facilitating calculation and display of vehicle speed. Of course, the detector 11 may also include means for detecting light waves of different wavelengths as well as sound waves of different frequencies, as desired.

As should be understood, the printer (not shown) which is contained within the housing 21 may consist of a printer having a roll of paper which may be advanced in a manner well known to those skilled in the art to facilitate printing and subsequent dispensing of a permanent record of the speed of the user's vehicle at the instant when the detector 11 detects that the vehicle's speed is being measured by police personnel. Alternatively, the housing 21 may not include a roll of paper. Instead, the user could insert a card (not shown) within the slot 25 and under the print head (not shown) of the internal printer (not shown) of the device 11 so that a permanent record may be printed thereon for subsequent manual removal.

The display screen 27 may be employed, where desired, to display a visual indication of the measured vehicle speed. The display screen 27 may also be suitably employed to provide a visual signal indicative of the fact that signals from a speed measuring device on a police vehicle have been detected.

Figure 3:
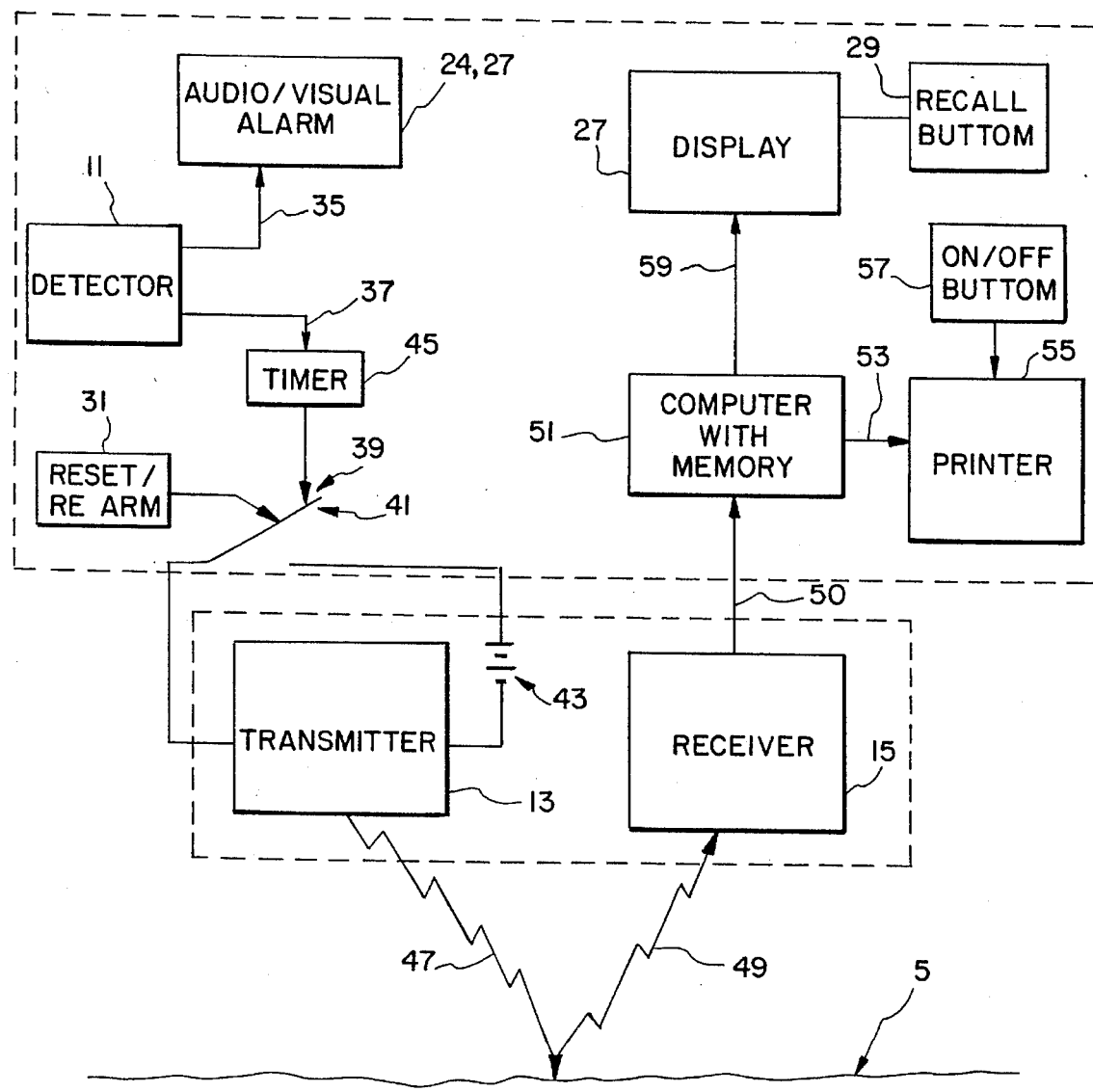
FIG. 3 shows a schematic representation of electrical circuitry intended to be used in the present invention.

With reference, now, to FIG. 3, a schematic representation of the electrical circuitry of the present invention will now be described in detail.

With reference to FIG. 3, it is seen that the detector 11 includes an electrical conductor 35 interconnecting the detector mechanism to the audio/visual alarm 24, 27. Concurrently, signals are sent via the electrical conductor 37 to an actuator 39 for the switch mechanism 41 which, when closed, activates the transmitter. A power source for the transmitter is generally designated by the reference numeral 43. Of course, if desired, the transmitter 13 may be powered directly by the vehicle battery.

As also shown in FIG. 3, a timer 45 is interposed in the conductor 37 between the detector 11 and the switch actuator 39. The timer is provided to allow deactivation of the switch actuator 39 after a pre-set period of time so that the transmitter 13 is not operating continuously. Thus, for example, the timer 45 may be set at five seconds so that after signals have emanated from the detector 11 via the electrical conductor 37 to the switch actuator 39 for five seconds, the timer 45 opens the conductor 37 at that location to terminate actuation signals to the actuator 39 thereby causing opening of the switch 41 and termination of operation of the transmitter 13. The reset re-arm button 31 may also be employed to accomplish this same result manually.

The receiver 15 may have a built-in power source or may be interconnected into the electrical circuitry of the vehicle itself. Signals 47 emanating from the transmitter 13 reflect off of a ground surface 5 and reflected signals 49 are received by the receiver 15 which transmits signals, such as Doppler signals, to the computer with memory 51 via the conductor 50.

The computer with memory 51 is preprogrammed to receive signals from the receiver 15 and to calculate, therefrom, speed data which is stored in the memory section thereof. The printer 55 is connected to the computer with memory 51 via the electrical conductor 53. When it is desired to operate the printer 55, either the on/off button 57 is operated or, as explained above, a blank card is inserted within the slot 25 in the housing 21 of the detector 11 and under the print head (not shown) of the printer 55 whereupon the print head prints the data indicative of the actual speed of the vehicle at the moment when the detector 11 detected a police personnel speed measuring device in operation.

Concurrently, data indicative of the user's vehicle speed is transmitted to the display 27 via the electrical conductor 59. The display 27 may, if desired, have its own internal memory allowing display to occur only upon activation of the recall button 29. Alternatively, the display 27 may have no internal memory and, may continuously display signals sent thereto via the conductor 59 without need for activation of the recall button 29. Either alternative is suitable for use in accordance with the teachings of the present invention.

Through the use of the present invention, unwarranted speeding tickets may be avoided. For example, when the user's vehicle is stopped by an apprehending officer, after showing the officer the driver's license, registration and proof of insurance, the police officer will normally explain to the vehicle owner that they were allegedly caught speeding. At this point, the user may activate the display 27 to display the actual measured vehicle speed in miles per hour (mph) as well as kilometers per hour (kph), as well as other information including the date, time of measurement, for example, in Greenwich Mean Time (GMT), vehicle description (make, model, year, color) including Vehicle Identification Number (VIN) and any other pertinent information. The date may, if desired, be that of Greenwich at the particular time. If that speed is the same as the speed which was concurrently measured by the police officer, the speeding ticket is valid and should be paid. If the two computed speeds differ, especially in the user's favor, the user may provide a printed record including all displayed information either by inserting a card within the card slot 25 or by activating the printer using the on/off button 57 to cause a permanent record to be printed, preferably in duplicate. One copy may be handed to the officer with another copy retained by the user for use as evidence in Court.

Faced with such evidence, the officer may agree not to issue the citation. Otherwise, the user may appear in Court and use the permanent record as evidence of innocence or, at minimum, of reasonable doubt as to guilt.

As such, an invention has been disclosed in terms of a preferred embodiment thereof which fulfills each and every one of the objects of the invention as set forth hereinabove and provides a new and useful combined radar detector, speed measuring device and printer for verifying vehicle speed of great novelty and utility.

Of course, various modifications, alterations and changes in the teachings of the present invention may be contemplated by those skilled in the art without departing from the intended spirit and scope thereof.

As such, it is intended that the present invention only be limited by the terms of the appended claims.

We claim:

1. A system mountable in a vehicle for verifying vehicle speed, comprising:
   a) detector means for detecting signals indicative of nearby use of a speed measuring device, said detector means including alarm means for notifying a user of detection of said signals;
   b) transmitter means activated responsive to sensing of said signals by said detector means, for transmitting further signals away from said vehicle toward a stationary surface;
   c) receiver means for receiving reflected signals from reflection of said further signals off said stationary surface, said reflected signals being transmitted to a computer with memory;
   d) said computer with memory receiving said reflected signals and calculating and storing vehicle speed.

2. The system of claim 1, wherein said detector means detects microwaves.

3. The system of claim 1, wherein said stationary surface comprises pavement.

4. The system of claim 1, operated by a battery power source.

5. The system of claim 1, further including printer means for printing a permanent record of a stored vehicle speed including date, time, vehicle identification, owner and speed.

6. The system of claim 1, further including display means for displaying a measured vehicle speed.

7. The system of claim 6, wherein said display means includes means for providing visual indication responsive to sensing of said signals.

* * * * *